United States Patent [19]

Armbrust

[11] Patent Number: 4,955,264
[45] Date of Patent: Sep. 11, 1990

[54] TOOL ASSEMBLY WITH A HYDRAULIC CHIP-BREAKING FLUID SYSTEM

[75] Inventor: William D. Armbrust, Cary, N.C.
[73] Assignee: Kennametal Inc., Latrobe, Pa.
[21] Appl. No.: 358,922
[22] Filed: May 30, 1989
[51] Int. Cl.⁵ ............................................. B23B 27/22
[52] U.S. Cl. ........................................ 82/158; 407/6; 407/11; 407/76
[58] Field of Search ........................................ 82/1–11, 82/158; 407/11, 66, 73, 76, 88, 92, 6

[56] References Cited

U.S. PATENT DOCUMENTS

| | | | |
|---|---|---|---|
| 3,364,800 | 1/1968 | Benjamin et al. | 407/11 |
| 3,889,520 | 6/1975 | Stoferle et al. | 407/11 |
| 4,598,617 | 7/1986 | Kubo et al. | 82/158 |
| 4,621,547 | 11/1986 | Yankoff | 82/1.11 |
| 4,636,118 | 1/1987 | Hunt | 409/136 |
| 4,695,208 | 9/1987 | Yankoff | 407/106 |

FOREIGN PATENT DOCUMENTS 39036  2/1985  Japan ..................... 407/11

Primary Examiner—William E. Terrell
Attorney, Agent, or Firm—Thomas R. Trempus

[57] ABSTRACT

The present invention is a tool assembly comprising a tool block and a tool holder capable of delivering chip-breaking fluid to the tool holder without a fixed attachment to the tool holder. The tool block is formed with a tool shank cavity having a tool support surface. The tool holder includes a shank insertable into the tool shank cavity of the tool block. A fluid delivery passage is formed in the tool block which terminate in an outlet opening. A primary fluid passage is formed in the tool holder and terminates in a discharge orifice positioned to direct a fluid jet at the chip being removed from the workpiece. A fluid path provides a path for the flow of chip-breaking fluid from the outlet of the delivery passage to the inlet of the primary fluid passage throughout the entire range of relative movement between the tool block and holder. In the preferred embodiment, the fluid path is a shallow recess formed in either the tool shank or tool block which forms an enclosed fluid cavity when the tool holder is mounted to the tool block.

9 Claims, 10 Drawing Sheets

TOOL ASSEMBLY WITH A HYDRAULIC CHIP-BREAKING FLUID SYSTEM

FIELD OF THE INVENTION

The present invention relates to machine tool holders for holding a cutting insert adapted to engage a workpiece and remove a chip therefrom, and more particularly to hydraulic chip breaking tool holders that use a high velocity fluid stream to break the chip removed from the workpiece into small segments.

BACKGROUND OF THE INVENTION

Cutting tools for performing metal working operations generally comprise a cutting insert having a surface terminating in a cutting edge and a tool holder formed with a seat adapted to receive the cutting insert. The cutting insert engages a workpiece and removes a chip therefrom. In some instances, the tool holder is formed with an internal fluid passage terminating in a discharge orifice for ejecting a high velocity fluid stream at the chip removed from workpiece to break it into small segments. The stream of fluid also serves to dissipate intense heat which is generated by the cutting operation.

In the past, fluid has been delivered to the tool holder by means of an external line connected directly to the tool holder shank or clamping block. This method permits adjustment of the tool holder with respect to the underlying support. However, when it is desired to remove or replace the tool holder, the external fluid line must first be disconnected from the tool holder. The additional steps of disconnecting and reconnecting the external fluid lines can significantly increase tool set-up time, particularly when a relatively large number of tool holders are involved.

SUMMARY AND OBJECTS OF THE INVENTION

The present invention is a tool assembly including a tool block and tool holder wherein means are provided for delivering chip-breaking fluid to the tool holder without a fixed attachment to the tool holder. This method allows the tool holder to be replaced without disconnecting and reconnecting external fluid lines.

The tool holder includes a head and a tool shank extending rearwardly from the head. The head is formed with an insert seat adapted to receive and hold a cutting insert. A fluid passage extends through the tool holder from an inlet in the shank to a discharge orifice in the head.

The tool block includes a tool cavity including a tool support surface adapted to receive the shank of the tool holder. The tool holder is adjustable with respect to the tool cavity within a predetermined range. A fluid delivery passage is formed in the tool block and extends from an inlet connected to a fluid source to an outlet formed in the tool support surface.

A fluid path means provides fluid communication between the outlet of the delivery passage and inlet of the main fluid passage in the tool holder throughout the range of relative movement between the tool block and tool holder. In a preferred embodiment, the fluid path means comprises an oblong transitioning cavity formed in one of the abutting surfaces of the tool shank and tool block which becomes an enclosed fluid cavity when the tool holder is mounted to the tool block.

From the foregoing, it is apparent that the primary object of the present invention is to provide a tool assembly comprising a tool block and tool holder incorporating a hydraulic chip-breaking fluid system.

Another object of the invention is to provide a tool assembly of the type described above, wherein means are provided for moving the tool holder with respect to the tool block to adjust the position of the cutting insert.

Another object of the invention is to provide a tool assembly of the type described wherein means are provided for transferring chip-breaking fluid to the tool holder without a fixed attachment to the tool holder.

Another object of the invention is to provide a tool assembly of the type described wherein means are provided for transferring chip-breaking fluid from a delivery passage in the tool block to a main passage in the tool holder throughout the entire range of relative movement between the block and tool holder.

Other objects and advantages of the present invention will become apparent and obvious from the study of the following description and the accompanying drawings which are merely illustrative of such invention.

DETAILED DESCRIPTION OF THE INVENTION

Figure 1:
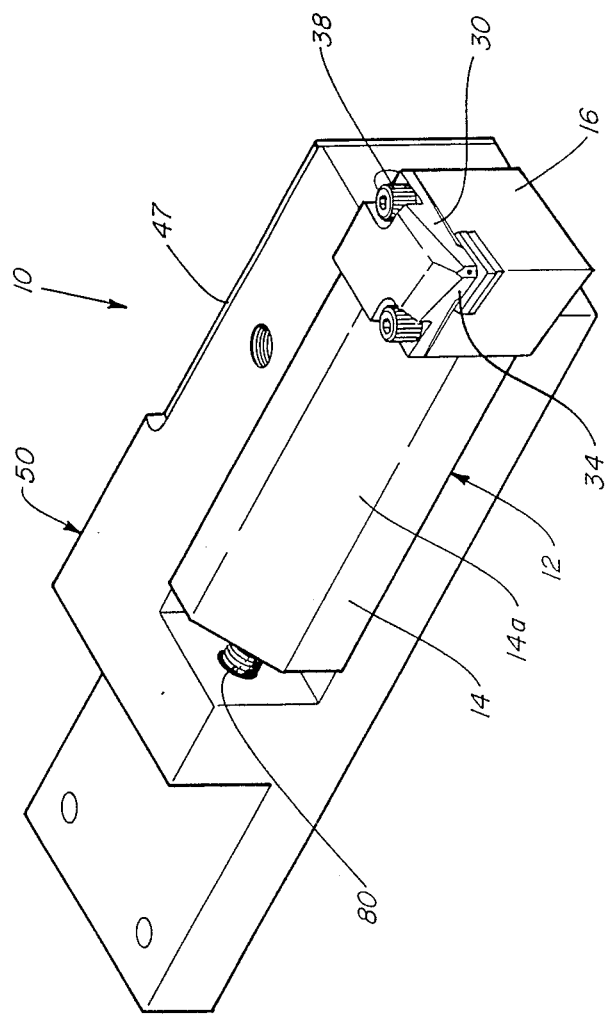
FIG. 1 is a perspective of the tool assembly of the present invention.

Referring now to the drawings and particularly to FIG. 1, the tool mounting device of the present invention is shown therein and indicated generally by the numeral 10. The tool mounting device 10 generally comprises a tool holder 12 secured to a mounting block (sometimes referred to as a tool block) 50.

Figure 2:
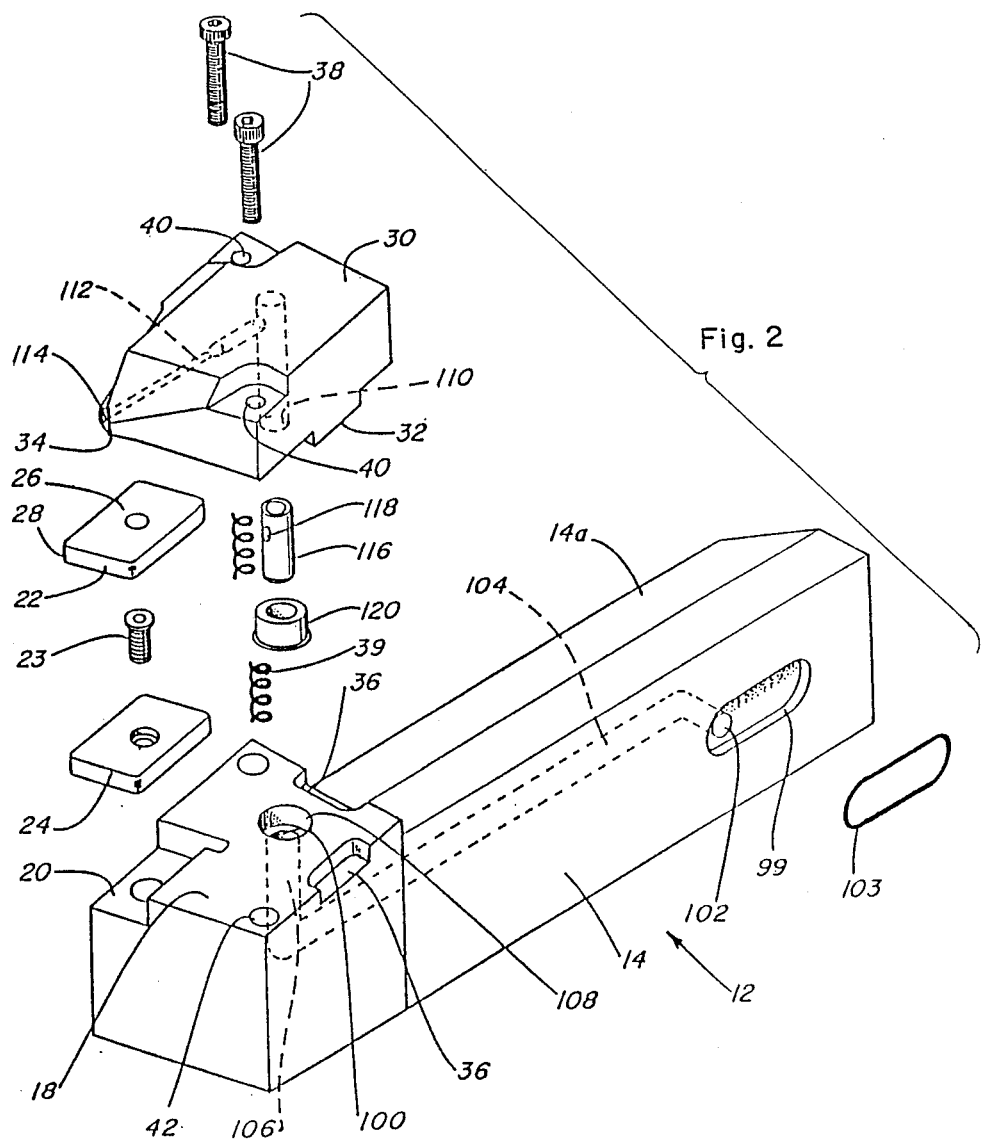
FIG. 2 is an exploded perspective of the tool holder portion of the tool assembly.

As shown in FIG. 2, the tool holder 12 includes a shank 14 and tool mounting head 16. The head 16 includes a top surface 18 formed with an insert seat 20 including a bottom wall and two angularly disposed side walls. The insert seat 20 is adapted to receive a diamond-shaped cutting insert 22 and shim 24. The shim 24 is secured to the bottom wall of the insert seat 20 by a lock pin 23 which extends through a recessed throughbore in the shim 24 and into a threaded bore in the bottom wall of the insert seat 20. The cutting insert 22 rests on top of the shim 24 so that its top surface 26 is exposed and the cutting edge 28 projects outwardly from the head 16. The cutting edge 28 is adapted to engage a workpiece and remove a chip of metal from the workpiece.

The cutting insert 22 is clamped in place by means of a clamping block 30, which is sometimes referred to as a nozzle head. The clamping block 30 functions both to clamp the cutting insert 22 within insert seat 20 and to direct a high velocity chip breaking stream at the chip to break it into small segments.

Clamping block 30 is a generally diamond shaped member which includes a pair of support legs 32 and a clamping tip 34. The support legs 32 rest within support leg seats 36 which are formed in the top surface 18 of the head 16, while the clamping tip 34 engages the top surface 26 of the cutting insert 22. The clamping block 30 is secured atop the head 16 by a pair of machine screws 38 which extend through recessed throughbores 40 in the clamping block 30 and into threaded bores 42 in the head 16. A pair of coil springs 39 are disposed within a recessed area at the top of the threaded bores 42 to apply a separating force to the head 16 when the machine screws 38 are loosened thus making it easier to index the cutting insert 22.

The machine screws 38 apply a downward force component to the clamping block 30 which is transmitted through the clamping tip 34 to the cutting insert 22. Preferably the clamping tip 34 is bent slightly so that the force applied to the insert 22 has both downward and rearward components to urge the insert against the bottom wall and angled side walls of the insert seat 20.

The tool holder 12 is formed with a fluid passage 100 extending from an inlet opening 102 to a discharge orifice 114. The fluid passage 100 is broken into two sections, the first portion being formed substantially in the tool holder shank 14 and the second portion being formed in the clamping block 30. It is understood, however that the fluid passage 100 could be a single, continuous passage.

The first portion of the fluid passage 100 comprises a main transition passage 104 and a vertical passage 106. The main transition passage 104 extends primarily along the longitudinal axis of the shank 14 from the inlet opening 102 into the head 16. The vertical passage 106 extends upwardly from the main transition passage 104 to the top surface 18 of the head 16. A seal cavity 108 is formed at the upper end of the vertical passage 106 and is adapted to receive a deformable seal 120.

The second portion of the fluid passage 100 comprises a second transition passage 110 extending from the bottom surface of the clamping block 30. A final discharge passage 112 extends from the second transition passage 110 and terminates at the discharge orifice 114. A dowel pin 116 having an internal passage 118 is pressed into the second transition passage 110 and extends downwardly from the clamping block 30. With the clamping block 30 mounted in place atop the head, the dowel pin 116 extends into the seal cavity 108 in the top surface of the head 16. The deformable seal 120 disposed within the seal cavity 108 surrounds the dowel pin 116. When the system is pressurized, the deformable seal 120 expands radially against the outer surface of the dowel pin 116 and the wall of the cavity 108 to prevent escape of fluid from the gap between the clamping block 30 and head 16.

Figure 3:
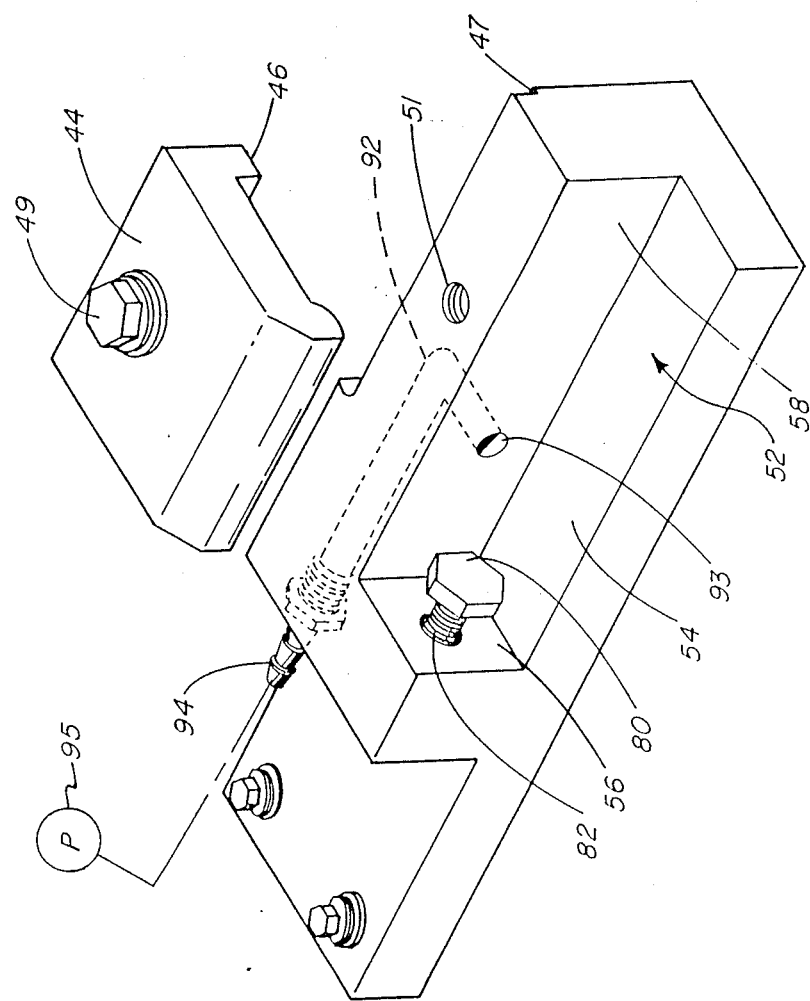
FIG. 3 is an exploded perspective of the tool block portion of the tool assembly.

Referring now to FIG. 3, the mounting block 50 is shown which includes a tool shank cavity 52 adapted to receive the shank 14 of the tool holder 12. The cavity 52 forms a bottom surface 54, a rear wall 56 and a side wall 58. A second clamping block 44 including a single elongated leg 46 and clamping tip 48 is mounted atop the tool block 50 and is adapted to secure the tool holder 12 in the tool holder cavity 52. The support leg 46 rests in a support leg seat 47 while the clamping tip 48 engages the bevelled surface 14a of the tool holder shank 14. A bolt 49 extends through a throughbore in the clamping block 44 and into a threaded bore 51 in the tool block 50. When the bolt 49 is tightened, the clamping tip 48 applies a force to the tool holder shank 14 having downward and sideward components so that the tool holder shank 14 is urged against the bottom surface 54 and side wall 58.

The tool mounting device includes a longitudinal adjustment mechanism to move the cutting tip in a direction parallel to the longitudinal axis of the tool holder 12. The longitudinal adjustment mechanism comprises an adjusting screw 80 inserted into a threaded bore 82 in the rear wall 56 of the tool holder cavity 52. The head of the adjusting screw butts against the rear of the tool holder shank 14. When turned in a clockwise direction, the adjusting screw 80 is threaded further into the rear wall 56, so that the tool holder 12 can be pushed further into the mounting block 50. When turned in a counter-clockwise direction, the adjusting screw is threaded out of the rear wall 56 so that the tool holder 12 is pushed further out of the mounting block 50.

The tool block 50 is formed with a delivery passage 92 extending from an inlet opening to an outlet opening 93 in the sidewall 58. The inlet opening is threaded to receive a fitting 94. An external line connects the fitting 94 to a pump 95 which generates pressure of up to about 3000 psi.

Because there is relative movement between the tool holder 12 and tool block 50, a fluid path means is provided to maintain fluid communication between the outlet 93 of the delivery passage 100 and the inlet 102 of the main fluid passage throughout the entire range of relative movement between the tool holder 12 and tool block 50. In the embodiment shown in FIGS. 1 through 3, the fluid path means comprises an oblong transitioning cavity 99 formed in the shank 14 of the tool holder 12 which encompasses the inlet 102 of the primary passage 100. When the tool holder 12 is mounted to the tool block 50, the oblong transitioning cavity 99 overlies the outlet 93 of the fluid delivery passage 92 and forms an enclosed cavity between the abutting surfaces of the tool holder and tool block.

The pump 95, delivery passage 92, transitioning cavity 99, and fluid passage 100 cooperate to eject a high velocity fluid jet at the chip being removed from a workpiece. Chip-breaking fluid flows under pressure through an external line from the pump 95 to the inlet of the delivery passage. Preferably, the pump generates pressure of up to about 3000 psi. The chip-breaking fluid flows through the delivery passage 92 and into the transitioning cavity 99. The fluid pressure causes the seal 103 to radially expand against the walls of the transitioning cavity 99 to form a tight seal for containing the chip-breaking fluid within the cavity 99. From the transitioning cavity 99, fluid enters the primary passage 100 through opening 102. Once in the tool holder 12, the fluid flows through the internal passage of the dowel pin 116 and into the clamping block 30. In the clamping block 30, fluid flows through the transition passage 110 and final discharge passage 112. Preferably, the final discharge passage 112 constricts the fluid flow to accelerate it to a velocity of up to 250 to 400 feet per second before it is discharged through the discharge orifice 114. The discharge orifice 114 directs the fluid jet at the chip removed from the workpiece to break it into small segments.

To the change or reposition the tool holder 12, the fluid flow to the delivery passage is shut off. The bolt 49 generating the clamping force on the tool holder 12 is loosened. The tool holder 12 can then be removed or repositioned in the tool holder cavity 52. Since there is no fixed attachment to the tool holder 12 replacement of the tool holder 12 is relatively fast. Once the new tool holder 12 is in place and correctly positioned in the tool holder cavity 52, the bolt 49 is retightened to clamp the tool holder 12 in place.

Figure 3A:
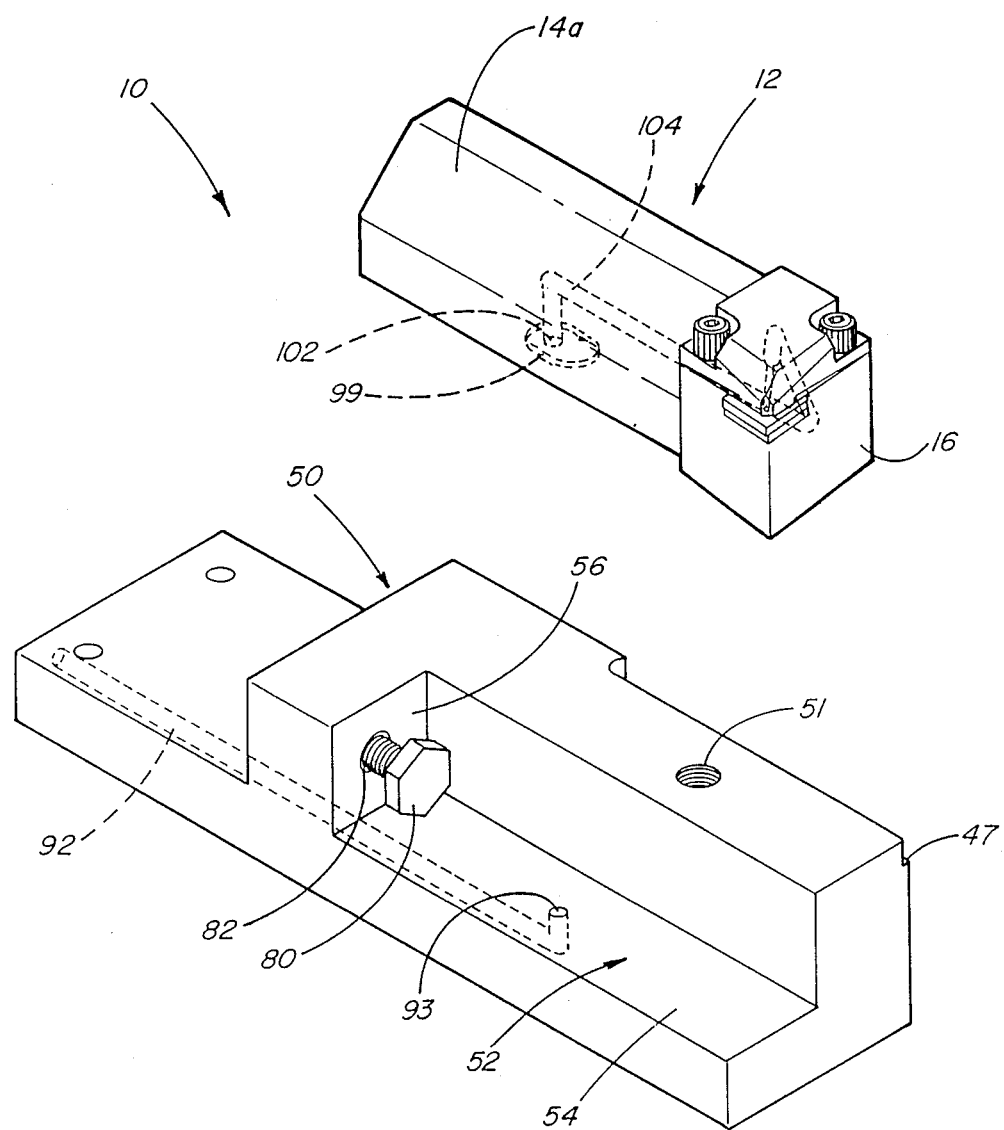
FIG. 3a is a perspective view of an alternate design for the tool assembly shown in FIGS. 1-3.

Turning to FIG. 3a, there is shown therein an alternate design for the tool mounting device 10 shown in FIGS. 1–3 and described above. Tool mounting block 10 shown in FIG. 3a is essentially the same structurally and functionally as the tool mounting block shown in FIGS. 1–3. The design shown in FIG. 3a differs only in that the chip breaking fluid is directed into the bottom of the tool holder 12 as opposed to the side of the tool holder. As seen in FIG. 3a, the outlet 93 is formed in the bottom surface 54 of the tool mounting block 50. The transitioning cavity 99 is in turn formed in the bottom of tool holder 12. It is seen that inlet 102 lies within the confines of the transitioning cavity 99. When the tool holder 12 is mounted within the mounting block 50 it is appreciated that the transitioning cavity 99 will overlie and encompass outlet 93 formed in the bottom surface 54 of the mounting block 50. This particular design allows the tool holder 12 to be radially adjusted with respect to the mounting block 50 and yet there remains fluid transfer capability between the mounting block 50 and the tool holder 12 over the selected radial range of adjustment.

Figure 4:
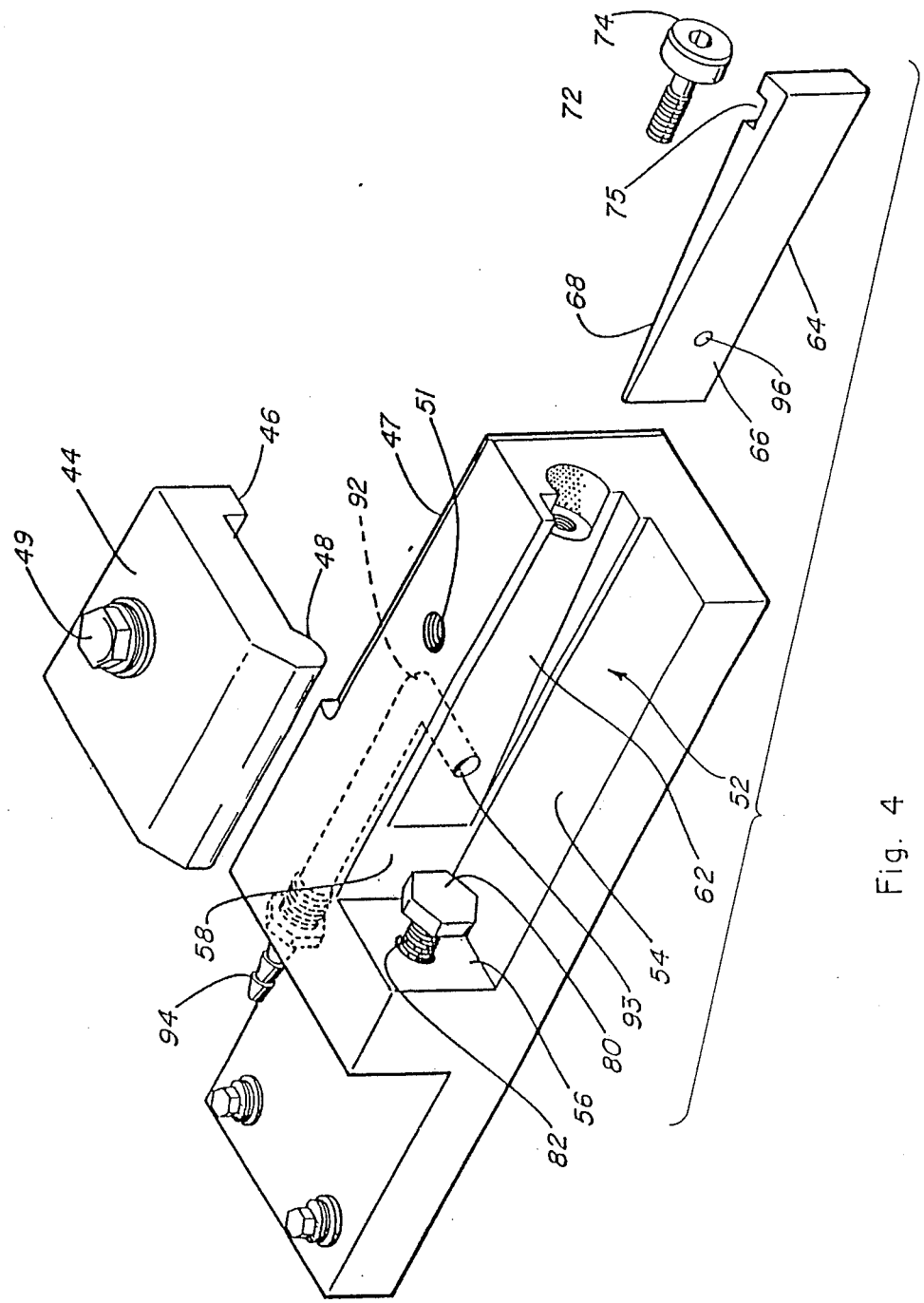
FIG. 4 is an exploded perspective of the tool block portion of the tool assembly in a second embodiment of the invention.
Figure 5:
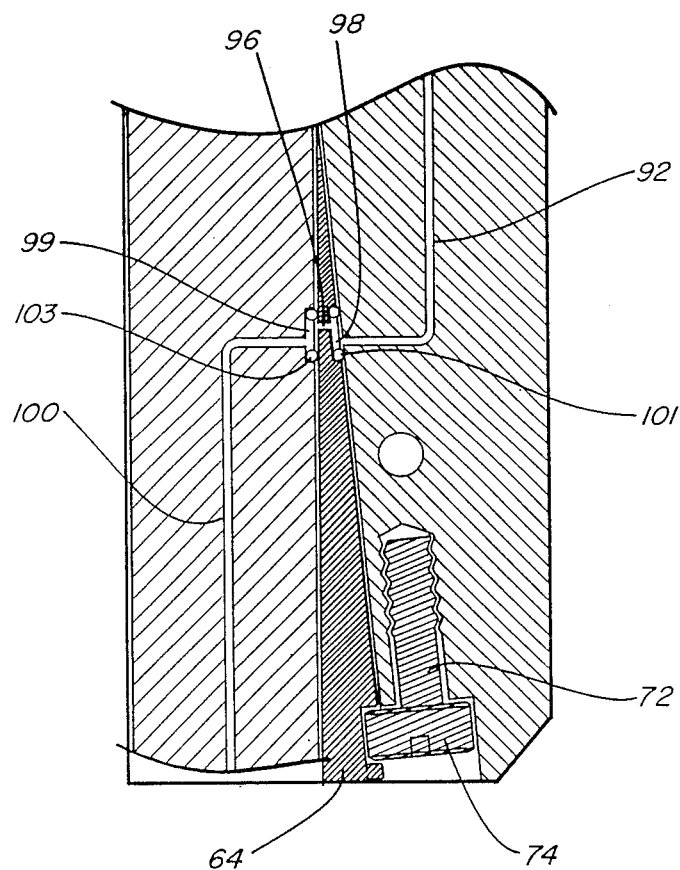
FIG. 5 is a partial longitudinal section view of the tool assembly of the second embodiment illustrating the fluid delivery system.
Figure 6:
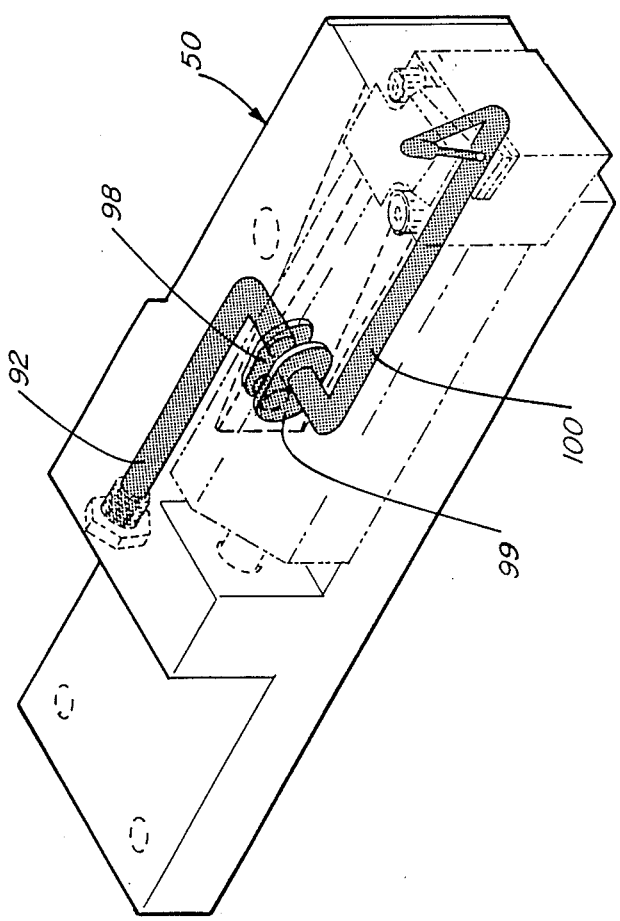
FIG. 6 is a perspective of the second embodiment of the tool assembly schematically illustrating the fluid delivery system.

A second embodiment of the invention shown in FIGS. 4 through 6 provides a lateral adjustment mechanism for adjusting the position of the cutting insert in a direction perpendicular to the longitudinal axis of the tool holder. The lateral adjustment mechanism comprises a ramp 62 formed in the side wall 58 of the tool holder cavity 52 and an adjusting wedge 64. The adjusting wedge 64 includes a flat tool contact surface 66 that engages the tool holder shank 14 and an angled surface 68 that engages the ramp 62. An adjusting screw 72 with an enlarged connecting head 74 is provided for moving the wedge 64 along the ramp 62. The head 74 inserts into a slot 75 in the angled surface 68. By turning screw 72, an axial force is applied to the adjusting wedge 64 to move it along the ramp 62, thus effecting lateral movement of the tool holder 12 within the tool holder cavity 52.

The fluid path means of the second embodiment provides a fluid path extending through the wedge 64 from the outlet 93 of the delivery passage 92 to the inlet 102 of the final fluid passage 100. As shown best in FIGS. 5 and 6, the fluid path means of the second embodiment includes first and second transitioning cavities 98 and 99, and a connecting passage 96. The first transitioning cavity 98 is formed in the wedge 64 although the cavity 98 may alternatively be formed in the tool block 50. The cavity 98 overlies the outlet opening 93 of the delivery passage 92. Since there is relative movement between the wedge 64 and mounting block 50, the transitioning cavity 98 is elongated in the direction of relative movement so as to encompass the outlet opening 93 of the delivery passage 92 throughout the entire range of relative movement between the wedge 64 and tool block 50. A radially expandable seal 101 is inserted into the oblong transitioning cavity 98 to contain the fluid within the cavity 98 and to prevent it from escaping through the gap between the tool block 50 and adjusting wedge 64. The connecting passage 96 extends from the first transitioning cavity 98 through the wedge 64.

A second transitioning cavity 99 is formed in the tool holder shank 14 to provide fluid communication between the outlet of the connecting passage 96 and the entrance opening 102 of the primary passage. (See FIG. 2) It is understood, however, that the second cavity 99 could alternatively be formed in the wedge 64. Again, since there is relative movement between the wedge 64 and tool holder 12, the second cavity 99 is elongated in the direction of relative movement so as to encompass the outlet of the connecting passage 96 and inlet 102 of the primary passage 100 throughout the entire range of relative movement between the wedge 64 and tool holder 12. A second seal 103 is inserted into the transitioning cavity 99 to contain fluid within the cavity 99 and to prevent its escape through the gap between the adjusting wedge 64 and tool holder 12.

In operation, the fluid flows through the delivery passage 92 in the tool block 50 and into the first transitioning cavity 98. From the transitioning cavity 98, the fluid enters the connecting passage 96 in the adjusting wedge 64. The fluid flows through the connecting passage 96 and into the second transitioning cavity 99 in the tool holder shank 14. From the second cavity 99, the fluid enters the fluid passage 100 in the tool holder 12 through opening 102. Fluid flows through the tool holder 12 in the manner previously described and its discharged as a chip-breaking stream from the discharge orifice 114. As in the first embodiment, the tool holder 12 can be replaced quickly and easily since there is no fixed attachment to the tool holder 12.

Figure 7:
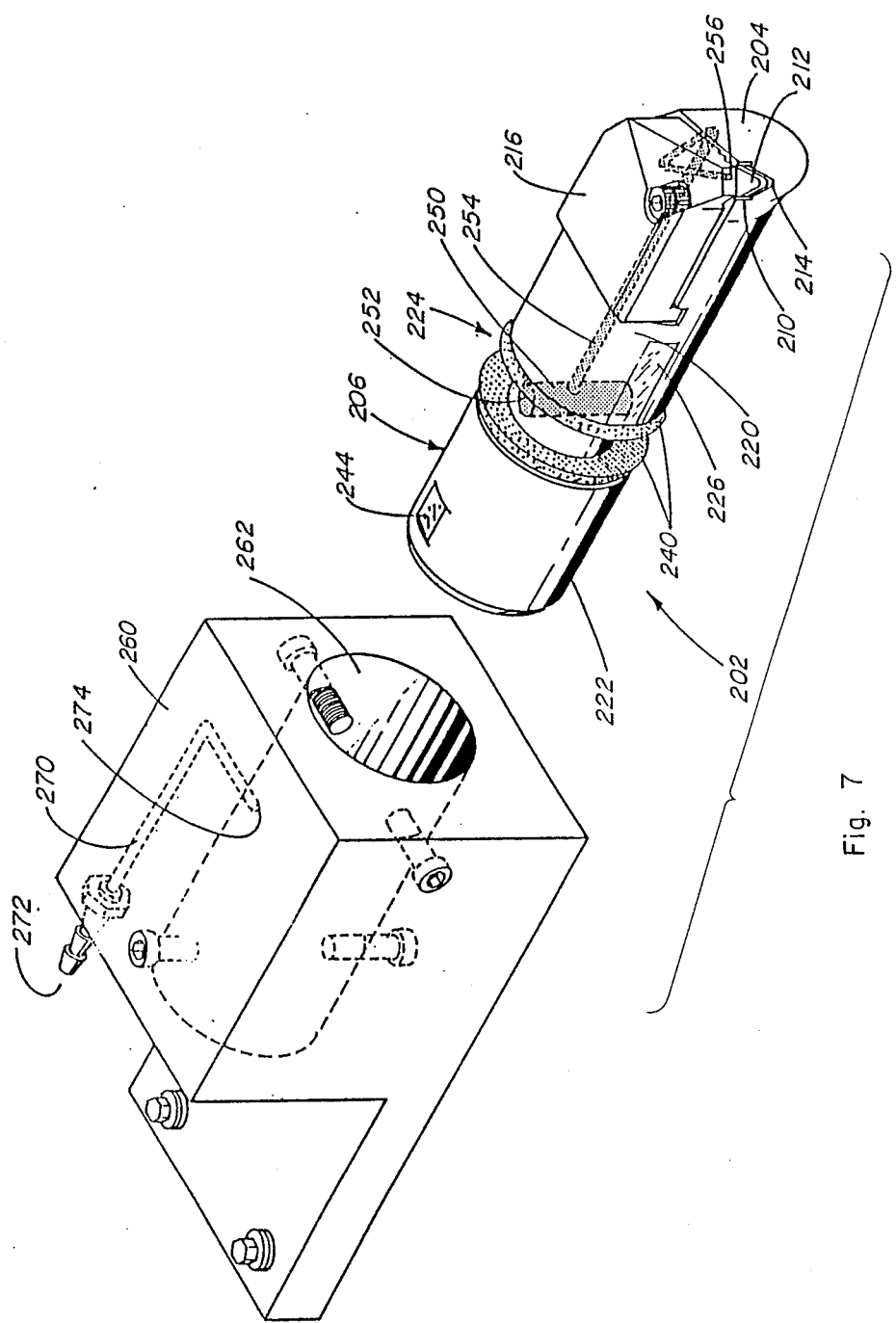
FIG. 7 is an exploded perspective of a third embodiment of the tool assembly.
Figure 8:
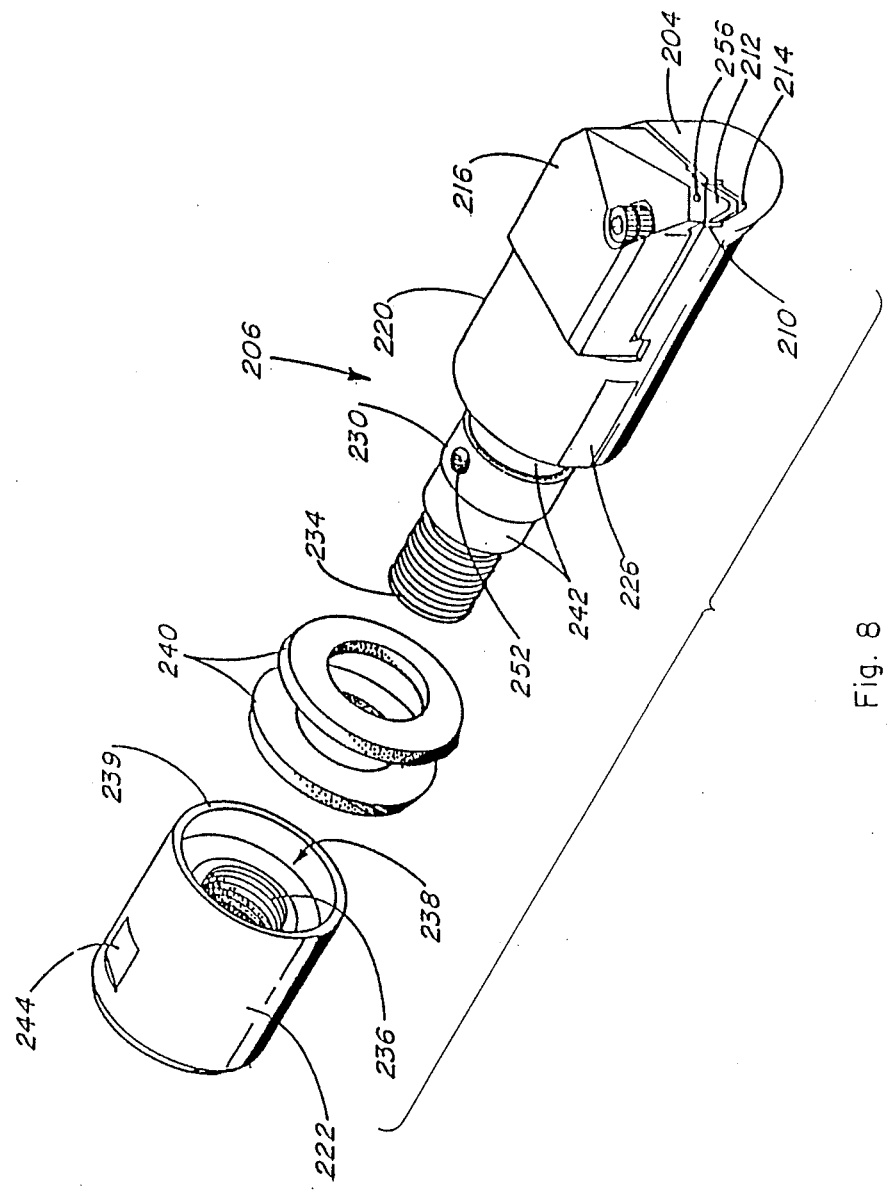
FIG. 8 is an exploded perspective of the tool holder of the third embodiment.
Figure 9:
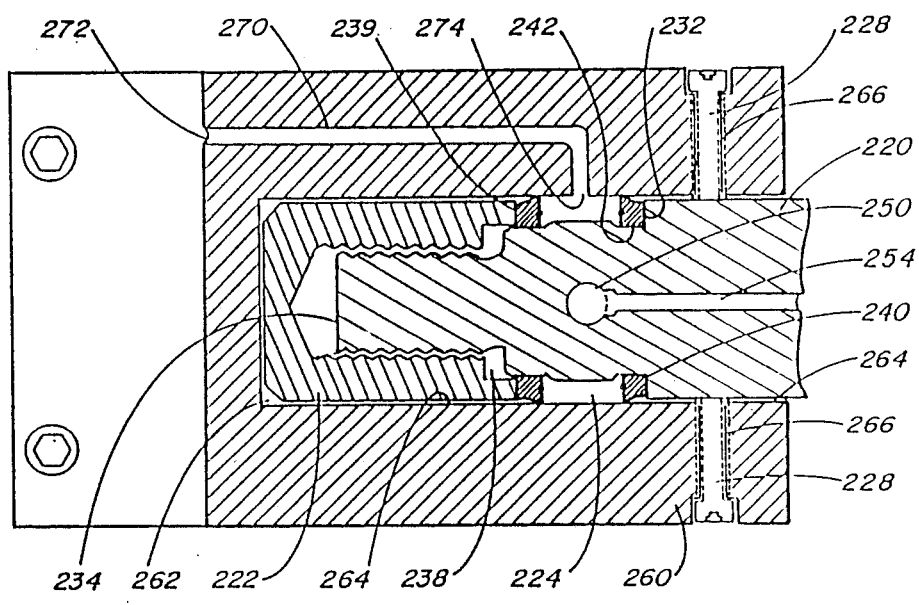
FIG. 9 is a longitudinal section view of the tool assembly of the third embodiment.

A third embodiment of the tool assembly is shown in FIGS. 7 through 9. The tool mounting system of the third embodiment includes a tool holder in the form of a boring bar 202 and tool block or mounting block 260 for mounting the boring bar 202. The boring bar 202 includes a head 204 and a generally cylindrical shank 206. The head includes a top surface 208 formed with an insert seat adapted to receive a diamond shaped cutting insert 212 and shim 214 as previously described. A clamping block 216 mounts atop the head 204 of the boring bar 202 to clamp the insert 212 within the insert seat 210. The structure and function of the clamping block is substantially the same as previously described.

The shank 206 of the boring bar 202 includes a forward section 220 and an end section 222 which are separated by an annular recess 224. The front section 220 of the shank 206 is contiguous with the head 204 and is formed with two diametrically opposed contact surfaces 226 which are engaged by set screws 228 as hereinafter described. A generally cylindrical connecting member 230 extends from the rear face of the forward section 220 of the shank 206. The connecting member 230 is narrower than the forward section of the shank so as to form a shoulder 232 between the different diameters. The shoulder 232 forms the front wall of the annular recess 224. An externally threaded shaft 234 extends from the back of the connecting member 230 to provide means for engaging and disengaging the end section 222 of the tool shank 206 which is provided with a matching threaded bore 236. A second pair of diametrically opposed contact surfaces 244 are formed in the outer surface of the end section 220 and are oriented at 90° with respect to the first pair. A shallow recess 238 is formed in the front face of the end section 222 to receive the end of the connecting member 230. The peripheral surface 239 surrounding the recess 238 forms the rear wall of the annular recess 224. By removing the end section 222 of the tool shank 206, a pair of ring seals 240 can be inserted over the connecting member and seated within respective seal grooves 242. Once the seals are in place, the end section 222 of the tool shank can be reinstalled and securely tightened.

An inlet passage 250 is formed in the boring bar and extends diametrically through the shank 206 between openings 252. A main passage 254 extends from the center of the inlet passage 250 to a discharge orifice formed in the tip of the clamping block 216. Fluid entering the inlet passage 250 is directed through the tool holder 12 in the same manner as previously described and is ultimately discharged from the discharge orifice 256.

Referring now to FIG. 8, the tool block 260 is formed with a generally cylindrical tool shank bore 262 adapted to receive the shank of the boring bar. The inner surface 264 of the tool shank bore 262 functions as a tool support surface. Two pairs of diametrically opposed bores 266 are formed in the tool block and extend perpendicularly to the axis of the tool shank bore 262. The bores 266 are threaded to receive the set screws 228. To secure the boring bar 202 in the tool block 260, the set screws 228 are tightened against the contact surfaces 226 and 244.

A fluid delivery passage 270 is formed in the tool block and extends from an inlet 272 to an outlet 274 formed in the inner surface 264 of the tool shank bore. The outlet 274 of the fluid delivery passage overlies the annular recess 224 in the boring bar which defines a fluid path connecting the outlet 274 of the delivery passage to the inlet 250 of the final fluid passage. In the preferred embodiment, the forward wall and rear wall of the annular recess 224 are spaced apart a sufficient distance to allow a degree of axial movement between the boring bar 202 and tool block 260 while maintaining fluid communication between the delivery passage and final passage. Further, it should be readily apparent that the geometry of the annular recess would allow 360° rotation of the boring bar 202 about its own axis without disrupting the flow of fluid through the annular recess 204.

Fluid discharged from the outlet 274 of the delivery passage 270 fills the annular recess 224 surrounding the boring bar 202. The fluid enters the inlet passage 250 of the boring bar 202 through openings 252. From the inlet passage 250, the fluid passes through the main passage 254 where it is subsequently accelerated and discharged from the discharge orifice 256.

From the forgoing it is apparent that the present invention provides a means for transferring fluid through a tool block 50 to a tool holder 12, even where the tool holder 12 moves in relation to the tool block 50. The invention also eliminates the need for a fixed connection to the tool holder 12.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. A high-pressure fluid chip breaking tool assembly having a tool holder axially adjustable within a mounting block and the capability of routing high pressure chip breaking fluid through both the mounting block and tool holder, comprising:
    (a) a tool block formed with a generally cylindrical tool shank bore extending along a longitudinal axis;
    (b) a fluid delivery passage formed in the tool block which extends from an inlet to an outlet;
    (c) a tool holder having a head for mounting a cutting insert adapted to engage a workpiece and remove a chip therefrom, and a generally cylindrical tool shank extending rearwardly from the head and adapted to be inserted into the tool shank bore;
    (d) a fluid passage formed in the tool holder which extends from an inlet in the shank to a discharge orifice in the head wherein said discharge orifice is positioned to direct a fluid jet at the chip removed from the workpiece to break it into small segments;
    (e) an annular recess having front and rear walls formed in the shank of the tool holder and extending circumferentially around the shank, wherein the annular recess defines a fluid path for directing the flow of high-pressure chip breaking fluid from the outlet of the delivery passage formed in the tool block to the inlet of the fluid passage in the tool holder;
    (f) adjustment means for adjusting the axial position of the tool holder along the longitudinal axis of the tool block through a selected axial adjustment range; and
    (g) wherein the annular recess is so dimensioned to allow axial movement of the tool holder with respect to the tool block throughout the selected axial adjustment range while maintaining fluid communication between the outlet of the delivery passage formed in the tool block and the inlet of the fluid passage in the tool holder.

2. The tool assembly according to claim 1 wherein the annular recess includes a bottom surface formed with a pair of seal grooves adjacent the front wall and rear wall respectively and wherein the tool assembly further includes a pair of radially expandable seals seated with respective grooves.

3. The tool assembly according to claim 2 wherein the inlet of the fluid passage is formed in the bottom surface of the annular recess between the seal grooves.

4. A high-pressure fluid chip breaking tool assembly having the capability of routing high-pressure chip breaking fluid through both a mounting block and an axially adjustable tool holder secured within the mounting block, comprising:
    (a) a tool mounting block having a tool holding cavity, a fluid inlet, a fluid outlet, and means for channelling fluid between the fluid inlet and outlet of the mounting block;
    (b) a tool holder having a longitudinal axis adapted to be received within the tool holding cavity of the mounting block and having a head adapted to receive and hold a cutting insert and including a fluid dispersing orifice, a fluid inlet, and a fluid channel interconnecting the fluid inlet of the tool holder with the fluid dispersing orifice;
    (c) means for securing the tool holder within the tool holder cavity of the mounting block;

(d) means for axially adjusting the tool holder over a selected range within the tool holding cavity of the mounting block such that the position of the cutting insert carried by the tool holder may be axially moved and adjusted with respect to the mounting block;

(e) means for transferring high-pressure chip breaking fluid into the inlet of the mounting block; and (f) means for directly transferring the high-pressure chip breaking fluid from the outlet of the mounting block to the inlet of the tool holder at any position within the selected axial adjustment range, whereby the tool holder may be axially adjusted through the selected axial adjustment range while at the same time providing for fluid flow from the outlet of the mounting block to the inlet of the tool holder irrespective of the axial position of the tool holder within the selected axial adjustment range.

5. The high-pressure fluid chip breaking tool assembly of claim 4 wherein the tool holder is appropriately secured within the mounting block, the mounting block outlet and the tool holder inlet form a flush side by side fluid tight joint that permits the tool holder to be readily removed from the mounting block without requiring the uncoupling of a fixed source line from the tool holder.

6. The high-pressure fluid chip breaking tool assembly of claim 5 wherein the mounting block outlet and tool holder inlet form side by side openings and where one opening has a smaller area than the other opening thereby permitting the smaller opening to be moved with respect to the larger opening but still enabling fluid to pass from the mounting block outlet into and through the tool holder inlet.

7. A method of axially adjusting a tool holder within a mounting block through a selected axial adjustment range and directing high-pressure chip breaking fluid from the mounting block into and through the tool holder irrespective of the position of the tool holder within its selected axial range of adjustment, comprising:

(a) directing high-pressure chip breaking fluid into, through and out an outlet associated with the mounting block;

(b) directing the high-pressure fluid from the outlet of the mounting block into an inlet associated with a tool holder and routing the high-pressure chip breaking fluid through the tool holder and out a discharge orifice formed in the tool holder where the fluid contacts and breaks chip material being removed;

(c) flush mounting the outlet of the mounting block with the inlet of the tool holder such that they lie face to face with respect to each other;

(d) axially adjusting the tool holder within the mounting block by moving the tool holder back and forth through a selected axial adjustment range;

(e) maintaining fluid communication between the flush mounted outlet and inlet of the mounting block and tool holder respectively at all times while the tool holder is being axially moved to adjust its position within its selected axial adjustment range; and (f) sealing the flush mounted joint formed by the outlet of the mounting block and the inlet of the tool holder such that the high-pressure chip breaking fluid is constrained to move from the outlet of the mounting block into and through the inlet of the tool holder irrespective of the position that the tool holder assumes within its selected axial adjustment range.

8. The method of claim 7 wherein the step of directing fluid from the mounting block into the tool holder includes the step of directing fluid from the mounting block into an annular cavity formed around the tool holder.

9. The method of claim 8 wherein the annular cavity lies adjacent to and is communicatively open to an outlet formed in the mounting block, and wherein the step of adjusting the position of the tool holder includes sliding the annular cavity back and forth with respect to the outlet but still maintaining fluid communication capability between the outlet of the mounting block and the annular cavity of the tool holder.

* * * * *